(12) United States Patent
Zhang

(10) Patent No.: US 10,878,525 B2
(45) Date of Patent: Dec. 29, 2020

(54) SYSTEM AND METHOD OF USER BEHAVIOR BASED SERVICE DISPATCH

(71) Applicant: BEIJING DIDI INFINITY TECHNOLOGY AND DEVELOPMENT CO., LTD., Beijing (CN)

(72) Inventor: Lingyu Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 10 days.

(21) Appl. No.: 16/046,975

(22) Filed: Jul. 26, 2018

(65) Prior Publication Data

US 2018/0374181 A1    Dec. 27, 2018

Related U.S. Application Data

(63) Continuation of application No. PCT/CN2017/089713, filed on Jun. 23, 2017.

(51) Int. Cl.
| | | |
|---|---|---|
| *G06Q 10/00* | (2012.01) | |
| *G06Q 50/30* | (2012.01) | |
| *G06Q 10/06* | (2012.01) | |
| *H04L 29/08* | (2006.01) | |
| *H04W 4/42* | (2018.01) | |

(52) U.S. Cl.
CPC ....... *G06Q 50/30* (2013.01); *G06Q 10/06311* (2013.01); *H04L 67/16* (2013.01); *H04W 4/42* (2018.02)

(58) Field of Classification Search
None
See application file for complete search history.

(56) References Cited

U.S. PATENT DOCUMENTS

2003/0065805 A1* 4/2003 Barnes, Jr. ......... G06Q 30/0283
709/231
2003/0220835 A1* 11/2003 Barnes, Jr. ......... G06F 3/04842
705/14.36

(Continued)

FOREIGN PATENT DOCUMENTS

CN    106385325 A    2/2017
CN    106558159 A    4/2017

OTHER PUBLICATIONS

Burt, David, Managing Suppliers Up to Speed, Aug. 1989, Harvard Business Review, https://hbr.org/1989/07/managing-suppliers-up-to-speed, p. 1-16.*

(Continued)

*Primary Examiner* — Joseph M Waesco
(74) *Attorney, Agent, or Firm* — Metis IP LLC

(57) ABSTRACT

Various embodiments of the present disclosure relate to user behavior based service dispatch. According to embodiments, initial impact factors of a service supplier for a plurality of requests are determined. If one or more requests are associated with user feedbacks concerning an adjusted property of the service, then the related initial impact factors of the service supplier can be adjusted based on the associated user feedbacks. Based on the adjusted impact factors, one or more requests are selected from the plurality of requests to be delivered to the service supplier.

20 Claims, 3 Drawing Sheets

(56) References Cited

U.S. PATENT DOCUMENTS

| | | | |
|---|---|---|---|
| 2005/0136949 A1* | 6/2005 | Barnes, Jr. ............ | G06Q 10/02 455/461 |
| 2007/0118426 A1* | 5/2007 | Barnes, Jr. ............ | G06Q 30/06 379/114.13 |
| 2007/0173266 A1* | 7/2007 | Barnes, Jr. ............ | G06F 3/167 455/456.1 |
| 2009/0144624 A1* | 6/2009 | Barnes, Jr. ............ | H04L 69/329 715/719 |
| 2011/0054956 A1 | 3/2011 | Meyer et al. | |
| 2011/0170837 A1* | 7/2011 | Barnes, Jr. ............ | H04L 67/18 386/239 |
| 2012/0086549 A1* | 4/2012 | Barnes, Jr. ............ | H04W 4/029 340/5.61 |
| 2012/0089470 A1* | 4/2012 | Barnes, Jr. ............ | G06Q 20/04 705/16 |
| 2013/0096966 A1* | 4/2013 | Barnes, Jr. ........ | G06Q 30/0241 705/5 |
| 2013/0132246 A1 | 5/2013 | Amin et al. | |
| 2015/0012341 A1 | 1/2015 | Amin | |
| 2015/0161554 A1 | 6/2015 | Sweeney et al. | |
| 2015/0234636 A1* | 8/2015 | Barnes, Jr. ............ | G06Q 20/32 715/728 |
| 2016/0078516 A1* | 3/2016 | Alnuwaysir ....... | G06Q 30/0625 705/26.62 |
| 2016/0292737 A1* | 10/2016 | Barnes, Jr. ............ | G06Q 20/04 |
| 2017/0011324 A1* | 1/2017 | Truong ................. | G06Q 50/32 |
| 2017/0046644 A1* | 2/2017 | Zhang ............. | G06Q 10/06311 |
| 2017/0177596 A1* | 6/2017 | Comstock ............... | H04L 51/20 |
| 2017/0364933 A1* | 12/2017 | Chen .................... | G06Q 10/067 |
| 2018/0032928 A1* | 2/2018 | Li .......................... | G06Q 10/02 |
| 2018/0033112 A1* | 2/2018 | Wu ....................... | G01S 5/0063 |
| 2018/0101877 A1* | 4/2018 | Song ................. | G01C 21/3492 |

OTHER PUBLICATIONS

The Extended European Search Report in Application No. 17890849.7 dated Nov. 22, 2018, 9 pages.
International Search Report in PCT/CN2017/089713 dated Mar. 28, 2018, 4 pages.
Written Opinion of the International Searching Authority in PCT/CN2017/089713 dated Mar. 28, 2018, 4 pages.
Notice of Allowance in Japanese application No. 2018-563451 dated Oct. 21, 2019, 5 pages.

* cited by examiner

SYSTEM AND METHOD OF USER BEHAVIOR BASED SERVICE DISPATCH

CROSS-REFERENCE TO RELATED APPLICATION

This application is a continuation of international Application No. PCT/CN2017/089713 filed on Jun. 23, 2017, designating the United States of America, the entire contents of which are hereby incorporated by reference.

FIELD

Embodiments of the present disclosure generally relate to service dispatch, and more particularly, to a method and system for dispatching on-demand services based on user behavior.

BACKGROUND

Nowadays users can access one or more services by using a computing device such as a mobile terminal or a personal computer (PC). These services, often called "on-demand services," may include, for example, taxi services, car-hailing services, carried-sharing service, meal-delivery service, and the like. With the availability of mobile communications, on-demand services grow rapidly. Thus, there is a need for dispatching requests for on-demand services more efficiently and accurately.

SUMMARY

In an aspect of the present disclosure, a computer-implemented method is provided. The method comprises receiving a plurality of requests for a service from a plurality of users; determining initial impact factors of a service supplier for the plurality of requests; receiving a plurality of user feedbacks on an adjusted property of the service from the plurality of users, each of the plurality of user feedbacks being associated with one of the plurality of requests; adjusting initial impact factors of the service supplier for the plurality of requests based on the plurality of user feedbacks; and selecting, from the plurality of requests and based on the adjusted impact factors, at least one request to be delivered to the service supplier.

In another aspect of the present disclosure, there is provided a device. The device comprises a processing unit; a memory coupled to the processing unit and storing instructions thereon. The instructions, when executed by the processing unit, perform acts including receiving a plurality of requests for a service from a plurality of users; determining initial impact factors of a service supplier for the plurality of requests; receiving a plurality of user feedbacks on an adjusted property of the service from the plurality of users, each of the plurality of user feedbacks being associated with one of the plurality of requests; adjusting the initial impact factors of the service supplier for the plurality of requests based on the plurality of user feedbacks; and selecting, from the plurality of requests and based on the adjusted impact factors, at least one request to be delivered to the service supplier.

In yet another aspect, a computer program product is provided. The computer program product is tangibly stored on a computer readable storage medium and includes instructions. The instructions, when executed on at least one processor, cause the at least one processor to receive a plurality of requests for a service from a plurality of users; determine initial impact factors of a service supplier for the plurality of requests; receive a plurality of user feedbacks on an adjusted property of the service from the plurality of users, each of the plurality of user feedbacks being associated with one of the plurality of requests; adjust the initial impact factors of the service supplier for the plurality of requests based on the plurality of user feedbacks; and select, from the plurality of requests and based on the adjusted impact factors, at least one request to be delivered to the service supplier.

In still another aspect, a computer-readable storage medium is provided. The computer-readable storage medium stores instructions. The instructions, when executed by one or more processors, cause the one or more processors to receive a plurality of requests for a service from a plurality of users; determine initial impact factors of a service supplier for the plurality of requests; receive a plurality of user feedbacks on an adjusted property of the service from the plurality of users, each of the plurality of user feedbacks being associated with one of the plurality of requests; adjust the initial impact factors of the service supplier for the plurality of requests based on the plurality of user feedbacks; and select, from the plurality of requests and based on the adjusted impact factors, at least one request to be delivered to the service supplier.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference signs refer to same or similar elements.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

As described herein, the term "service" refers to any service that can be requested by end users, such as taxi service, car-hailing service, ride-sharing service, private car service, meal-delivery service, and the like. Only for the sake of discussion and without suggesting any limitations as to the scope of the present disclosure, some embodiments will be discussed with reference to a transportation service. However, it is to be understood that the principles of the present disclosure apply to any other suitable services as well.

The terms "user" and "customer" can be used interchangeably herein to refer to individuals who request or order a service. The term "service supplier" is used to refer to individuals or entities that can provide the service. As an example, a user can request a service, such as a transportation or delivery service (for example, food delivery), and a service supplier such as a driver, food supplier or the like can communicate with the service provider and/or the user to arrange for the service.

Figure 1:
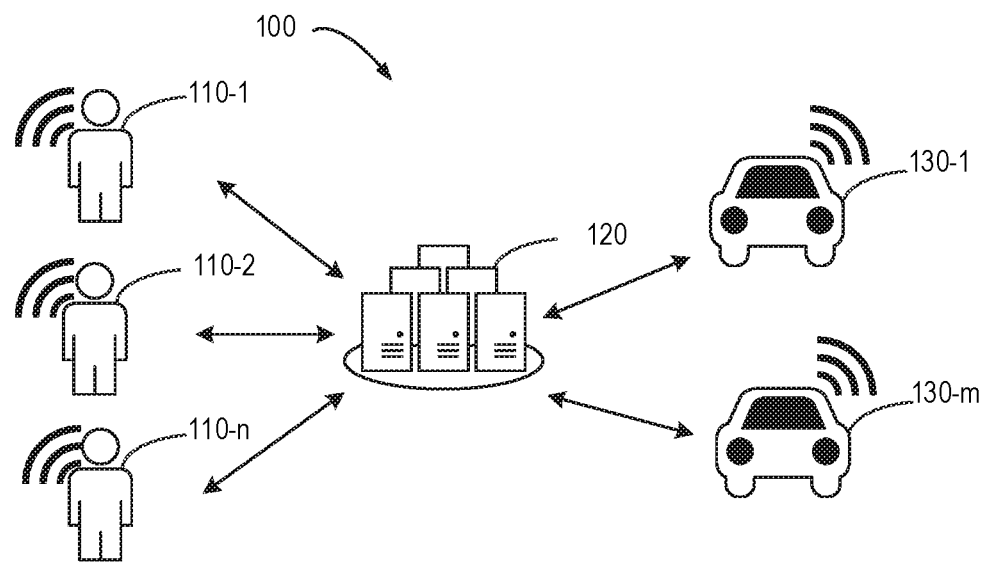
FIG. 1 illustrates a block diagram of an environment where embodiments of the present disclosure can be implemented.

FIG. 1 shows a block diagram of a system 100 where embodiments of the present disclosure can be implemented. It is to be understood that the structure and functionality of the environment 100 are described only for the purpose of illustration without suggesting any limitations as to the scope of the present disclosure. The present disclosure can be embodied with a different structure and/or functionality.

As shown, system 100 includes a server(s) 120, for example. The server 120 receives requests for a service from users 110-1, 110-2, . . . 110-n which are collectively referred to as "user(s) 110", process and dispatch the requests to suitable service suppliers (in this example, drivers) 130-1, . . . , 130-m which are collectively referred to "service supplier(s) 130". The server 120 may also facilitate communications between the users 110 and service suppliers 130. For example, the server 120 may communicate with devices of the users 110 and/or service suppliers 130 through wired and/or wireless connections, including but not limited to, a cellular network system and a wireless local area network (WLAN) system.

The users 110 and service suppliers 130 may use any suitable electronic devices that can provide network connectivity and communications. Examples of the devices include, but are not limited to, mobile terminals such as mobile phones, tablet computers, laptop computers, personal digital assistances (PDAs), wearable devices such as digital watches or glasses, fixed type devices such as PCs, and the like.

In operation, the users 110 may use their devices to access the server 120, for example, in order to provide data/information, send requests/orders for the service, and receive data/information from the server 120. Likewise, the service suppliers 130 can operate their devices, for example, on-board the vehicles and communicate with the server 120. To this end, the users 110 and service suppliers 130 may download and install respective applications from the server 120 or any other servers not shown here.

By way of example, in the taxi service scenario, a user 110 may send to the server 120 a request for a transportation service. The request at least specifies a pick-up location and a destination. In response, the server 120 selects one or more service suppliers 130 and forwards the request to these service suppliers 130 so that they can make responses to the user's request.

According to one embodiment, in selecting request to be dispatched to a driver, the server 120 may primarily take into account the physical and/or temporal distance from the users to that driver. For example, if the driver is physically near the user and/or can arrive at the pick-up location within a relatively short time, then the user's request may be dispatched to the driver.

In order to provide an adaptive service, according to other embodiments of the present disclosure, system 100 may dispatch the requests, among other things, based on behaviors of the users 110. More particularly, according to embodiments of the present disclosure, the server 120 may propose to adjust one or more properties of the service to allow one or more users 110 to provide their feedbacks. The term "feedback" herein refers to whether a user accepts or declines a service provided by the service suppliers 130. The server 120 can then select the target service suppliers 130 based on these feedbacks.

Example embodiments will now be discussed with reference to FIGS. 2 and 3. FIG. 3 shows a method 300 for service dispatch that can be implemented by the server 120. In the following, FIG. 3 will be mainly explained with reference to the service supplier 130-1. However, it is to be understood that this is only for the purpose of illustration without suggesting any limitations as to the scope of the present disclosure. The present disclosure can be applied to any other service supplier, for example, service supplier 130-2. As discussed above, according to embodiments of the present disclosure, the server 120 may propose to adjust at least one property of the service. Examples of such a property include, but are not limited to, price of the service, vehicle model, and the like. In the following, only for illustration, some exemplary embodiments will be discussed with reference to price as an exemplary property of the service.

At block 302, the server 120 receives one or more requests for a service from one or more users 110. As described above, the service may be a transportation service and the users 110 may send to the server 120 a request for a transportation service. The request at least specifies a pick-up location and a destination.

When dispatching the requests, according to embodiments of the present disclosure, the server 120 may take into account the feedback from the users. Specifically, at block 304, the server 120 obtains an initial impact factor of the service supplier 130-1 for the request. An impact factor of a service supplier for a request represents a degree to which the service supplier facilitates or contributes to the transaction of the service. In some embodiments, the initial impact factor may be obtained from the default price for the request, the number of service suppliers nearby, the number of users nearby, and/or the like.

For example, if the server 120 receives a request from the user 110-1 that specifies a very long route and a pick-up location close to the service supplier 130-1, the initial impact factor of the service supplier 130-1 for this request may be relatively high. The initial impact factor may also be influenced by other service suppliers 130. For example, if there are many other service suppliers 130 close to the pick-up location, the initial impact factor of the service supplier 130-1 for the request may be decreased accordingly.

In an embodiment, the impact factor may be a numerical representation. To this end, the server 120 may determine the probability (denoted by E) that the request is accepted by any of the service suppliers 130, for example, as below:

$$E = 1 - (1 - psr) \times (1 - a \times str) \quad (1)$$

where the parameter str represents an estimated possibility for the service supplier 130-1 to accept the request, the parameter psr represents the probability that the request is accepted by any other service suppliers 130, and the parameter a represents whether the request is to be transmitted to the service supplier 130-1. If the value of the parameter a is 1, the request is transmitted to the service supplier 130-1; whereas if the value of the parameter a is 0, the request is not transmitted to the service supplier 130-1.

The parameters psr and str may be determined from the default price for the request, the number of service suppliers 130 close to the user making the request, the number of users close to the user making the request, and/or the like. For example, if the server 120 receives a request from the user 110 that specifies a very long route and a pick-up location close to the service supplier 130-1, the parameter str may be relatively high, implying a high estimated possibility for the service supplier 130-1 to accept the request. If there are many other service suppliers 130 close to the pick-up location, the parameter psr may be relatively high, implying a high probability that the request is accepted by any of the other service suppliers 130.

As shown in Equation (1), the probability E is related to the parameter a, which represents whether the request is to be transmitted to the service supplier 130-1. Accordingly, the initial impact factor can be obtained by computing the derivative of the probability E with respect to the parameter a. From Equation (1), the initial impact factor may be determined as below:

$$\frac{dE}{da} = str \times (1 - psr) \qquad (2)$$

where $$\frac{dE}{da}$$

denotes the derivative of the probability E with respect to the parameter a and represents the impact factor of the service supplier for the request. It can be seen from Equation (2) that the impact factor is positively correlated with the parameter str (the estimated possibility for the service supplier 130-1 to accept the request) and is negatively correlated with the parameter psr (the probability for the request to be accepted by other service suppliers 130).

At block 306, the server 120 receives one or more user feedbacks on an adjusted property of the service from the one or more users. The adjusted property of the service may be, for example, an adjusted price. For example, when receiving a request from the user 110 specifying a pick-up location and a destination, the server 120 may determine whether the price of the service should be adjusted relative to a default price. The default price may be determined, for example, by the route length associated with the request, namely, the distance from the pick-up location to the destination. For example, if the number of vehicles near the pick-up location is much smaller than the number of users near the pick-up location, the server 120 may increase the price of the service and send an indication of the adjusted price to the requesting user 110.

Figure 2:
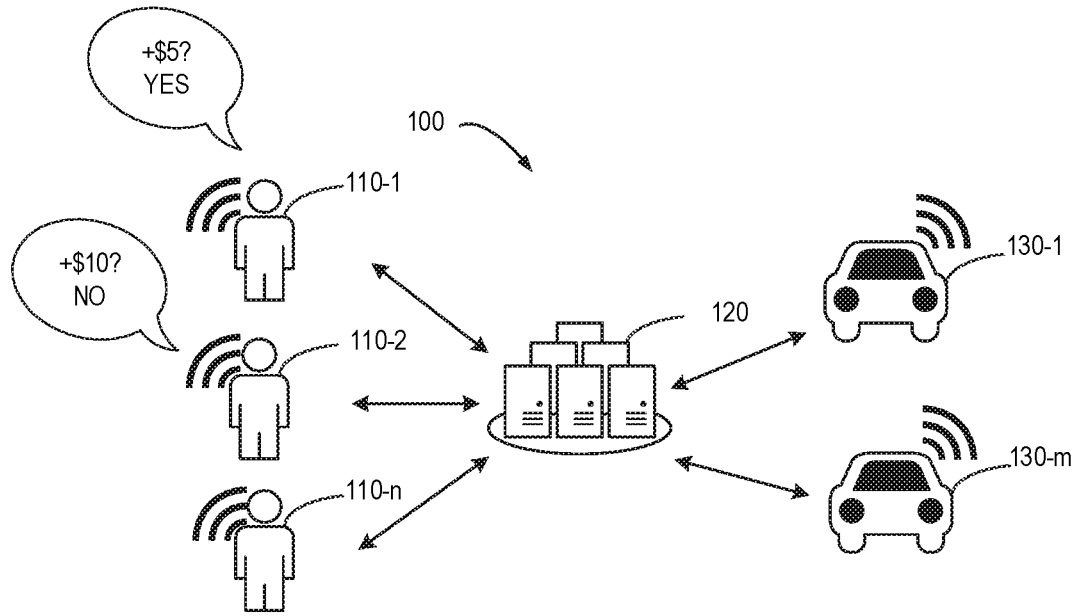
FIG. 2 illustrates a block diagram of an environment where embodiments of the present disclosure can be implemented.
Figure 3:
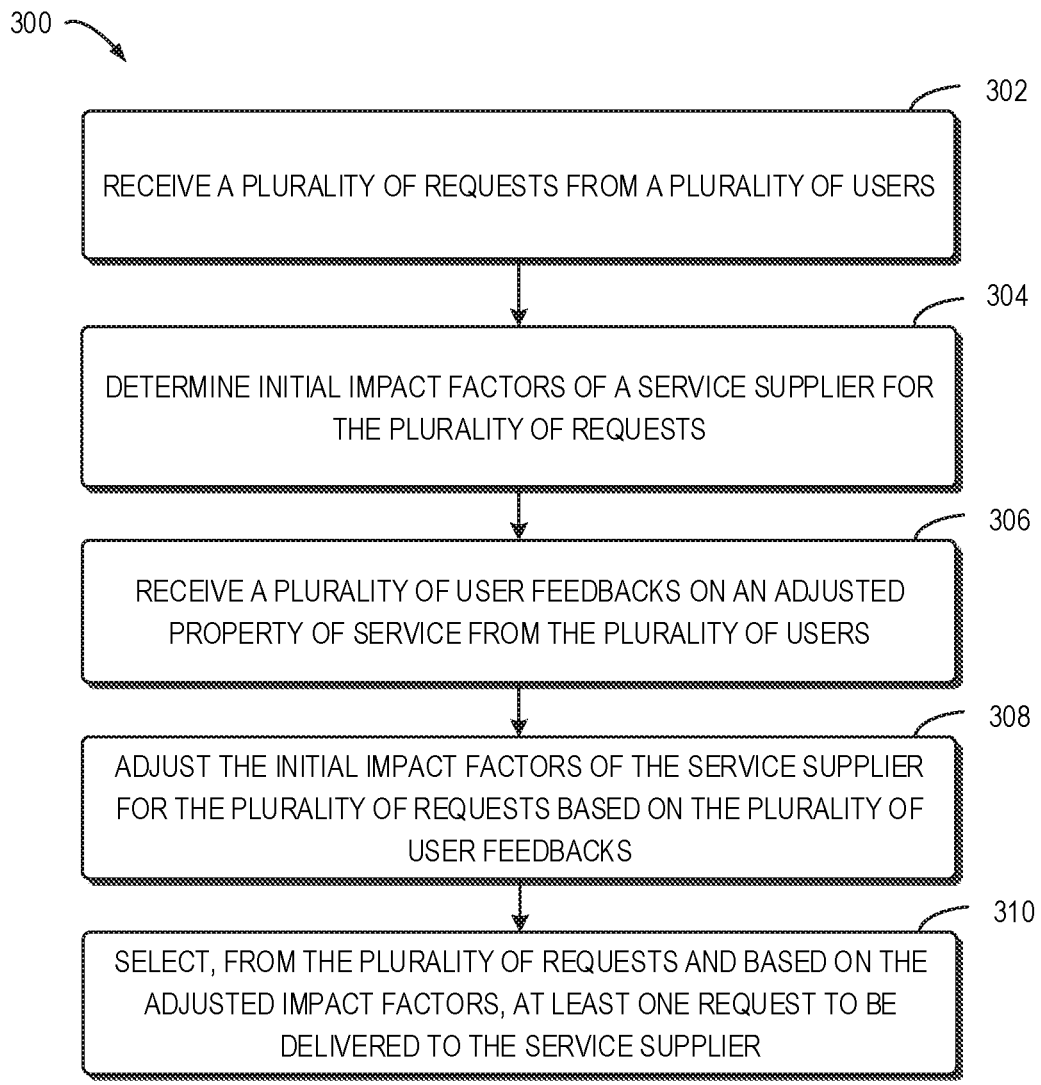
FIG. 3 illustrates a flowchart of a dispatch method in accordance with embodiments of the present disclosure.

In the example as shown in FIG. 2, the prices to be charged to the users 110-1 and 110-2 may be increased by $5 and $10, respectively. Such indications may be rendered on the devices of the users 110, for example, as pop-up windows, audio alerts, or the like. The users 110 may agree or refuse to accept the adjusted price. Then a positive or negative feedback on the adjusted price will be sent back to the server 120.

At block 308, for any requests with associated user feedbacks, the server 120 adjusts the initial impact factors of the service supplier 130-1 for those requests based on the user feedbacks. Still as shown in FIG. 2, for example, the user 110-1 may accept the adjusted price while the user 110-2 may refuse the adjusted price. In this case, the server 120 increases the impact factor of the service supplier 130-1 for the request from the user 110-1 who provides a positive feedback and decreases the impact factor of the service supplier 130-1 for the request from the user 110-2 who provides a negative feedback. For the requests without associated user feedbacks, however, the server 120 does not adjust the initial impact factors of the service suppliers 130 for those requests.

In some embodiments, the impact factor may be adjusted by weighting the initial impact factor, as below:

$$\frac{dE}{da} = w_i \times str \times (1 - t_i \times psr) \qquad (3)$$

where $w_i$ and $t_i$ represent weights for the parameters str and psr, respectively, with i representing a few different instances.

By default, the weights $w_i$ and $t_i$ are set to be one, that is, $w_1=1$ and $t_1=1$. As shown in FIG. 2, the user 110-1 accepts the adjusted price while the user 110-2 refuses the adjusted price. The server 120 may increase the impact factor of the service supplier 130-1 by increasing the weight $w_i$ and/or decreasing the weight $t_i$ for the request from the user 110-1 to, for example, $w_2=1.2$ and/or $t_2=0.8$. However, the server 120 may decrease the impact factor of the service supplier 130-1 by decreasing the weight $w_i$ and/or increasing the weight $t_i$ for the request from the user 110-2 to, for example, $w_3=0.8$ and/or $t_3=1.2$.

It is to be understood that Equations (1), (2), and (3) are described only for the purpose of illustration without suggesting any limitations as to the scope of the present disclosure. The present disclosure can be embodied with any other suitable impact factors.

At block 310, the server 120 selects, from a number of requests and based on the impact factors, at least one request to be delivered to the service supplier 130-1. For example, the server 120 may arrange the requests in a decreasing order of the impact factors of the service supplier 130-1 for the requests. For example, the server 120 may determine whether the impact factor of a service supplier 130-1 for one request ranks first among the impact factors of the service supplier 130-1 for the number of requests. If yes, the server 120 determines that the request should be delivered to the service supplier 130-1. Then, the service supplier 130-1 may accept the request and the deal is made. If no, the server 120 determines that the request should not be delivered to the service supplier 130-1.

In some embodiments, the server 120 may determine a ranking of the impact factor of a service supplier 130-1 for a request among the impact factors of the service supplier 130-1 for the number of requests. If it is determined that the ranking of the impact factor for the request exceeds a predefined threshold, the server 120 determines that the request should be delivered to the service supplier 130-1.

Then, the service supplier 130-1 may accept the request and the deal is made. If it is determined that the ranking of the impact factor for the request does not exceed the predefined threshold, the server 120 determines that the request should not be delivered to the service supplier 130-1.

Through the above description of exemplary embodiments, it will be appreciated that embodiments of the present disclosure can provide adaptive services to the users by dispatching the requests based on behaviors of the users. Conventional service dispatch techniques do not take into account of the user's preferences for promoted services. Thus, the service suppliers may not be satisfied with the requests or orders that they receive. As a result, the service suppliers may refuse the requests and the efficiency of the dispatching system may be reduced accordingly. By providing adaptive services based on behaviors of the users, according to embodiments of the present disclosure, the dispatching system can significantly improve the satisfaction of the users as well as the service suppliers. Additionally, the efficiency of the dispatching system can also be significantly improved by dispatching suitable orders to the service suppliers.

Figure 4:
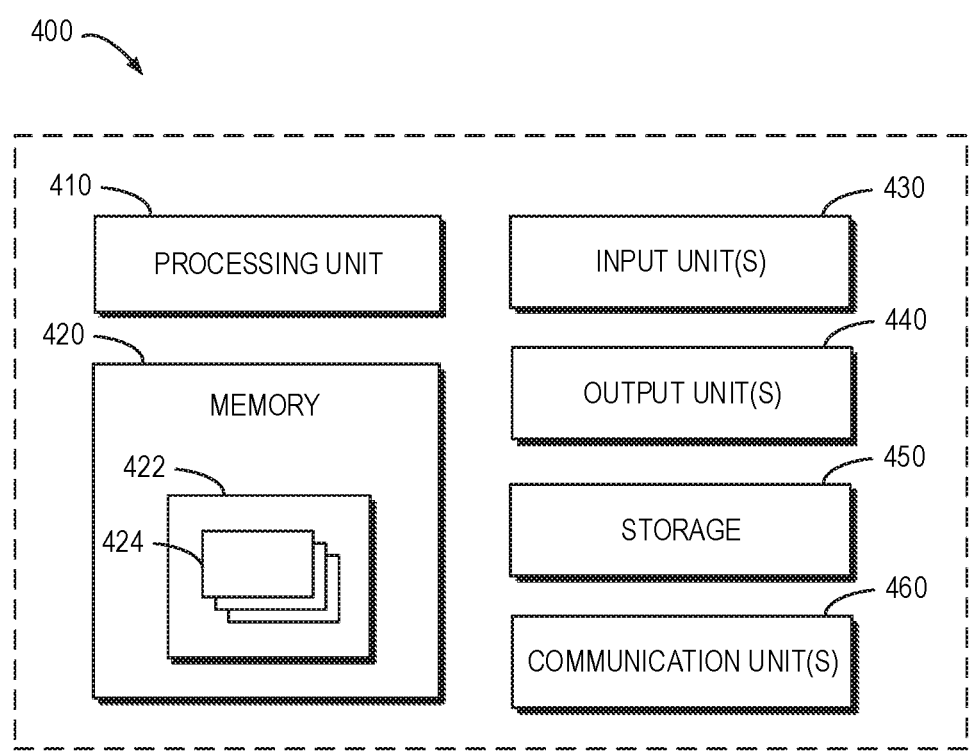
FIG. 4 illustrates a block diagram of an example computing system/server in which embodiments of the present disclosure may be implemented.

FIG. 4 shows a block diagram of an exemplary computing system 400, similar to the server 100 shown in FIG. 1. The server 120 may be implemented by the computing system 400. The computing system 400 as shown in FIG. 4 is only an example, which should not limit the function and scope of use of the present disclosure. Rather, embodiments of the present disclosure may be implemented in conjunction with any other type of computing environment now known or later developed, for example, a cloud computing system. Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service.

As shown in FIG. 4, the computing system 400 is in a form of a general-purpose computing device. Components of the computing system 400 may include, but are not limited to, one or more processors or processing units 410, a memory 420, one or more input units 430, one or more output units 440, storage 450, and one or more communication units 460. The processing unit 410 may be a real or a virtual processor and is capable of performing various processes in accordance with a program stored in the memory 420. In a multi-processing system, multiple processing units execute computer-executable instructions to increase processing power.

The computing system 400 typically includes a variety of machine readable medium. Such medium may be any available medium that is accessible by the computing system 400, including volatile and non-volatile medium, removable and non-removable medium. The memory 420 may be volatile memory (for example, registers, cache, a random-access memory (RAM)), non-volatile memory (for example, a read only memory (ROM), an electrically erasable programmable read only memory (EEPROM), a flash memory), or some combination thereof. The storage 450 may be removable or non-removable, and may include machine readable medium such as flash drives, magnetic disks or any other medium which can be used to store information and which can be accessed within the computing system 400.

The computing system 400 may further include other removable/non-removable, volatile/non-volatile computing system storage medium. Although not shown in FIG. 4, a disk driver for reading from or writing to a removable, non-volatile disk (for example, a "floppy disk"), and an optical disk driver for reading from or writing to a removable, non-volatile optical disk can be provided. In these cases, each driver can be connected to the bus 18 by one or more data medium interfaces. The memory 420 may include at least one program product having a set (for example, at least one) of program modules that are configured to carry out the functions of various implementations of the subject matter described herein.

A program/utility tool 422 having a set (at least one) of the program modules 424 may be stored in, for example, the memory 420. Such program modules 424 include, but are not limited to, an operating system, one or more applications, other program modules, and program data. Each or a certain combination of these examples may include an implementation of a networking environment. The program modules 424 generally carry out the functions and/or methodologies of implementations of the subject matter described herein, for example, the method 300.

The input unit(s) 430 may be one or more of various different input devices. For example, the input unit(s) 430 may include a user device such as a mouse, keyboard, trackball, etc. The input unit(s) 430 may implement one or more natural user interface techniques, such as speech recognition or touch and stylus recognition. As other examples, the input unit(s) 430 may include a scanning device, a network adapter, or another device that provides input to the computing system/server 400. The output unit(s) 440 may be a display, printer, speaker, network adapter, or another device that provides output from the computing system/server 400. The input unit(s) 430 and output unit(s) 440 may be incorporated in a single system or device, such as a touch screen or a virtual reality system.

The communication unit(s) 460 enables communication over communication medium to another computing entity. Additionally, functionality of the components of the computing system/server 400 may be implemented in a single computing machine or in multiple computing machines that are able to communicate over communication connections. Thus, the computing system/server 400 may operate in a networked environment using logical connections to one or more other servers, network personal computers (PCs), or another common network node. By way of example, and not limitation, communication media include wired or wireless networking techniques.

The computing system/server 400 may also communicate, as required, with one or more external devices (not shown) such as a storage device, a display device, and the like, one or more devices that enable a user to interact with the computing system/server 400, and/or any device (for example, network card, a modem, etc.) that enables the computing system/server 400 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

I claim:

1. A method being implemented on a computing device, having communication ports that communicate with a plurality of first mobile devices associated with a plurality of service requesters and a plurality of second mobile devices associated with a plurality of service suppliers and vehicles, a memory, a processor, and processing circuits coupled to the communication ports, wherein the memory coupled to the processing unit and storing instructions thereon, the method comprising:

receiving, via the communication ports, first electronic signals encoding a plurality of requests for a service from the plurality of first mobile devices associated with the plurality of service requesters, wherein each of the plurality of requests comprises a pick-up location and a destination input by the service requesters through one or more user interfaces on the first mobile device;

determining, by the processor, a plurality of physical locations of the plurality of second mobile devices associated with the plurality of service suppliers;

determining, by the processor, a service supplier from the plurality of service physical or temporal distance from the pick-up location;

determining, by the processor, an initial impact factor of the service supplier for each of the plurality of requests;

receiving, via the communication ports, second electronic signals encoding a plurality of user feedbacks on an adjusted property of the service from the plurality of first mobile devices associated with the plurality of service requesters, wherein each of the plurality of user feedbacks is associated with one of the plurality of requests and input by one of the service requesters through a user interface on one of the first mobile devices corresponding to the one of the plurality of requests, wherein the receiving the plurality of user feedbacks on the adjusted property of the service comprising, determining, by the processor, a property based on a route corresponding to the pick-up location and the destination for each of the plurality of requests;

determining, by the processor, the adjusted property based on the property and a comparison between a numbers of user and a number of service providers relating to the pick-up location for each of the plurality of requests;

sending an indication of the adjusted property to each of the plurality of first mobile devices, wherein the indication is displayed as a pop-up window and an audio alert, wherein an increased value between the adjust property and the property is displayed on the pop-up window and stated in the audio alert, prompting the service requestors to agree or refuse to accept the increased value to trigger the first mobile devices to send the user feedbacks to the computing device via the communication ports;

for each of the plurality of requests, adjusting, by the processor, the initial impact factor of the first service supplier based on each of the plurality of user feedbacks;

selecting, by the processor, based on the adjusted impact factor for each of the plurality of requests, at least one request from the plurality of requests; and transmitting the selected at least one request to the second mobile device associated the first service supplier.

2. The method of claim 1, wherein the initial impact factor is represented at least in part by a first parameter representing an estimated possibility for the service supplier to accept the request and a second parameter representing an estimated possibility for other service suppliers to accept the request.

3. The method of claim 2, wherein the adjusting the initial impact factors comprising:

in response to determining that one of the plurality of requests being associated with a positive feedback on the adjusted property, increasing, by the processor, the initial impact factor of the service supplier for the request.

4. The method of claim 2, wherein the adjusting the initial impact factors comprising:

in response to determining that one of the plurality of requests being associated with a negative feedback on the adjusted property, decreasing, by the processor, the initial impact factor of the service supplier for the request.

5. The method of claim 3, wherein increasing the initial impact factor of the service supplier for the request comprising increasing the first parameter or decreasing the second parameter.

6. The method of claim 4, wherein increasing the initial impact factor of the service supplier for the request comprising decreasing the first parameter or increasing the second parameter or both.

7. The method of claim 1, wherein the service is a transportation service and the property is a price of the transportation service.

8. A system for user behavior based service dispatch, comprising:
 communication ports to:
  communicate with a plurality of first mobile devices associated with a plurality of service requesters; and
  communicate with a plurality of second mobile devices associated with a plurality of service suppliers and vehicles,
  wherein the plurality of first mobile devices and the plurality of second mobile devices communicate with an online on-demand service platform:
 processing circuits coupled to the communication ports, wherein during operation, the processing circuits are directed to:
  receive, via the communication ports, first electronic signals encoding a plurality of requests for a service from the plurality of first mobile devices associated with the plurality of service requesters, wherein each of the plurality of requests comprises a pick-up location and a destination input by the service requesters through one or more user interfaces on the first mobile devices;
  determine a plurality of physical locations of the plurality of second mobile devices associated with the plurality of service suppliers;
  determine a service supplier from the plurality of service suppliers, wherein the physical locations of the second mobile devices are within a physical or temporal distance from the pick-up location;
  determine an initial impact factor of the service supplier for each of the plurality of requests;
  receive, via the communication ports, second electronic signals encoding a plurality of user feedbacks on an adjusted property of the service from the plurality of first mobile devices associated with the plurality of service requesters and input by one of the service requesters through a user interface on one of the first mobile devices corresponding to the one of the plurality of requests, wherein each of the plurality of user feedbacks is associated with one of the plurality of requests, wherein receive the plurality of user feedbacks on the adjusted property of the service comprising,
  determine a property based on a route corresponding to the pick-up location and the destination for the plurality of requests;
  determine the adjusted property based on the property and a comparison between a numbers of users and a number of service providers relating to the pick-up location for each of the plurality of requests;
  send, via the communication ports, an indication of the adjusted property to each of the plurality of first mobile devices, wherein the indication is displayed as a pop-up window and an audio alert, wherein an increased value between the adjust property and the property is displayed on the pop-up window and stated in the audio alert, prompting the service requestors to agree or refuse to accept the increased value to trigger the first mobile devices to send the user feedbacks to the computing device via the communication ports;
  for each of the plurality of requests, adjust the initial impact factor of the first service supplier based on each of the plurality of user feedbacks;
  select, based on the adjusted impact factor for each of the plurality of requests, at least one request from the plurality of requests; and
  transmit the selected at least one request to the second mobile device associated with the first service supplier.

9. The system of claim 8, wherein the initial impact factor is represented at least in part by a first parameter representing an estimated possibility for the service supplier to accept the request and a second parameter representing an estimated possibility for other service suppliers to accept the request.

10. The system of claim 9, wherein to adjust the initial impact factors, the processing circuits are directed to:
 in response to determining that one of the plurality of requests being associated with a positive feedback on the adjusted property, increase the initial impact factor of the service supplier for the request.

11. The system of claim 9, wherein to adjust the initial impact factors, the processing circuits are directed to:
 in response to determining that one of the plurality of requests being associated with a negative feedback on the adjusted property, decrease the initial impact factor of the service supplier for the request.

12. The system of claim 10, wherein to increase the initial impact factor of the service supplier for the request, the processing circuits are further directed to perform at least one of operations including increasing the first parameter or decreasing the second parameter.

13. The system of claim 11, wherein to increase the initial impact factor of the service supplier for the request, the processing circuits are further directed to perform at least one of operations decreasing the first parameter or increasing the second parameter.

14. The system of claim 8, wherein the service is a transportation service and the property is a price of the transportation service.

15. A non-transitory computer readable medium, comprising at least one set of instructions, wherein when executed by at least one processor of an electronic terminal, the at least one set of instructions directs the at least one processor to perform acts of:
 receiving first electronic signals encoding a plurality of requests for a service from a plurality of first mobile devices associated with a plurality of service requesters, wherein each of the plurality of requests comprises a pick-up location and a destination input by the service requesters through one or more user interfaces on the first mobile devices;
 determining a plurality of physical locations of the plurality of second mobile devices associated with the plurality of service suppliers;
 determining a service supplier from the plurality of service suppliers, wherein the physical locations of the second mobile devices are within a physical or temporal distance from the pick-up location;

determining an initial impact factor of e service supplier for each of the plurality of requests;

receiving second electronic signals encoding a plurality of user feedbacks on an adjusted property of the service from the plurality of first mobile devices associated with the plurality of service requesters, wherein each of the plurality of user feedbacks is associated with one of the plurality of requests and input by one of the service requesters through a user interface on one of the first mobile devices corresponding to the one of the plurality of requests, wherein receiving the plurality of the user feedbacks on the adjusted property of the service comprising, determining a property based on a route corresponding to the pick-up location and the destination for each of the plurality of requests;

determining the adjusted property based on the property and a comparison between a number of users and a number of service providers relating to the pick-up location for each of the plurality requests;

sending an indication of the adjusted property to each of the plurality of first mobile devices, wherein the indication is displayed as a pop-up window and an audio alert, wherein an increased value between the adjust property and the property is displayed on the pop-up window and stated in the audio alert, prompting the service requesters to agree or refuse to accept the increased value to trigger the first mobile devices to send the user feedbacks to the computing device via the communication ports;

for each of the plurality of requests, adjusting the initial impact factor of the first service supplier based on each of the plurality of user feedbacks;

selecting, based on the adjusted impact factors, at least one request from the plurality of requests; and transmitting the selected at least one request to the second mobile device associated with the first service supplier.

16. The non-transitory computer readable medium of claim 15, wherein the initial impact factor is represented at least in part by a first parameter representing an estimated possibility for the service supplier to accept the request and a second parameter representing an estimated possibility for other service suppliers to accept the request.

17. The non-transitory computer readable medium of claim 16, wherein the adjusting the initial impact factors comprising:

in response to determining that one of the plurality of requests being associated with a positive feedback on the adjusted property, increasing the initial impact factor of the service supplier for the request.

18. The non-transitory computer readable medium of claim 16, wherein the adjusting the initial impact factors comprising:

in response to determining that one of the plurality of requests being associated with a negative feedback on the adjusted property, decreasing the initial impact factor of the service supplier for the request.

19. The non-transitory computer readable medium of claim 17, wherein increasing the initial impact factor of the service supplier for the request comprising increasing the first parameter or decreasing the second parameter.

20. The non-transitory computer readable medium of claim 18, wherein increasing the initial impact factor of the service supplier for the request comprising decreasing the first parameter or increasing the second parameter.

* * * * *